(12) United States Patent
Cabiche (10) Patent No.: US 10,053,021 B2
(45) Date of Patent: Aug. 21, 2018

(54) VEHICLE-TOP OBJECT CARRIER

(71) Applicants: Raul Arnaldo Cabiche, C.A. de Buenos Aires (AR); Ivana Andrea Pereyra, Jundiai (BR)

(72) Inventor: Raul Arnaldo Cabiche, C.A. de Buenos Aires (AR)

(73) Assignees: Raul Arnaldo Cabiche, C.A. de Buenos Aires (AR); Ivana Andrea Pereyra, Jundiai (BR)

( * ) Notice: Subject to any disclaimer, the term of this patent is extended or adjusted under 35 U.S.C. 154(b) by 0 days.

(21) Appl. No.: 15/526,185

(22) PCT Filed: Nov. 12, 2015

(86) PCT No.: PCT/IB2015/058741
§ 371 (c)(1),
(2) Date: May 11, 2017

(87) PCT Pub. No.: WO2016/120687
PCT Pub. Date: Aug. 4, 2016

(65) Prior Publication Data
US 2017/0327050 A1   Nov. 16, 2017

(30) Foreign Application Priority Data

Nov. 12, 2014   (AR) .......................... P20140104251
Nov. 5, 2015    (AR) .......................... P20150103603

(51) Int. Cl.
*B60R 9/00*    (2006.01)
*B60R 9/045*   (2006.01)
(Continued)

(52) U.S. Cl.
CPC .............. *B60R 9/045* (2013.01); *B60R 9/048* (2013.01); *B60R 9/055* (2013.01)

(58) Field of Classification Search
CPC ................................ B60R 9/045; B60R 9/048
(Continued)

(56) References Cited

U.S. PATENT DOCUMENTS 8,640,933 B1 * 2/2014 McCray .................. B60R 9/042
                                                                  224/310
2002/0185506 A1 * 12/2002 Kmita .................. A47D 13/025
                                                                  224/159
(Continued)

FOREIGN PATENT DOCUMENTS

CN    201863776 U    6/2011
EP    0718155 A1     6/1996
(Continued)

OTHER PUBLICATIONS

Ekblom, Henrik; International Search Report and Written Opinion for International Patent Application No. PCT/IB2015/058741; European Patent Office; dated Sep. 23, 2016.

*Primary Examiner* — Nathan J Newhouse
*Assistant Examiner* — Lester L Vanterpool
(74) *Attorney, Agent, or Firm* — Thomas E. Lees, LLC (57) ABSTRACT

Retaining and securing means for load carrying modular platform to a top railing on a vehicle's roof. Said retaining means are a pair of spaced apart longitudinal members linked by transversally spaced crossbars.
All crossbars have a constant area cross section, resting on small columns projecting upwardly from said longitudinal members.
The platforms are secured between pairs of crossbars having a portion of bottom surface bounded by opposite sidewalls with transversely aligned pairs of recesses, with profiles complementary to the crossbar's intercepting said bottom surface, forming a longitudinal slot.
The width of each crossbar is greater that the width of each recess, while the width of the slot is greater that the width (Continued)

of said column. The upward portion of each platform defines engagement and retention means for the individual load to he conveyed on each of said platforms.

9 Claims, 6 Drawing Sheets

(51) Int. Cl.
    *B60R 9/055*     (2006.01)
    *B60R 9/048*     (2006.01)

(58) Field of Classification Search
    USPC .................................... 224/320, 321, 330
    See application file for complete search history.

(56) References Cited

U.S. PATENT DOCUMENTS

| | | | | |
|---|---|---|---|---|
| 2003/0052145 A1* | 3/2003 | Aftanas | .................. | B60R 9/042 224/310 |
| 2003/0201288 A1* | 10/2003 | Ford | ...................... | B60R 3/005 224/310 |
| 2004/0173651 A1* | 9/2004 | Kim | ........................ | B60R 9/042 224/310 |
| 2004/0188478 A1* | 9/2004 | Williams | ................ | B60R 9/042 224/310 |
| 2006/0175368 A1* | 8/2006 | Fallis, III | ............... | B60R 9/042 224/310 |
| 2007/0090139 A1* | 4/2007 | McKenzie | .............. | B60R 3/005 224/310 |
| 2013/0108360 A1* | 5/2013 | Rayos | ..................... | F16B 17/00 403/361 |
| 2014/0097219 A1* | 4/2014 | Reiber | ................... | B60R 9/055 224/310 |

FOREIGN PATENT DOCUMENTS

| | | |
|---|---|---|
| EP | 1442938 A1 | 8/2004 |
| ES | 2242926 T3 | 11/2005 |
| FR | 2518470 A1 | 6/1983 |

\* cited by examiner

VEHICLE-TOP OBJECT CARRIER

CROSS-REFERENCE TO RELATED APPLICATIONS

This application is a § 371 National Stage Entry Application of International Application No. PCT/M2015/058741, filed Nov. 12, 2015, published as "RETAINING AND FASTENING MEANS TO A TOP RAILING PLACED ON A VEHICLE'S ROOF, FOR AT LEAST ONE MODULAR SELECTIVELY REMOVABLE PLATFORM, CARRIER OF A GENERIC OBJECT", which claims the benefit of AR Application no. P20140104251, filed Nov. 12, 2014 and AR P20150103603, filed Nov. 5, 2015, the disclosures of which are incorporated herein by reference.

FIELD OF THE INVENTION

This instant invention relates to a set of means for receiving and retaining at least one modular platform on the roof of a vehicle, capable of supporting and carrying a generic object, wherein this modular platform is selectively removable from said receiving and retaining means together with the cargo therewith carried.

In order to provide a correct interpretation of the meaning of words and names given to the means employed in this instant invention, it is understood that the following words have the following meanings:

- Top railing luggage carrier: It indicates a series of longitudinal and transversal rods placed on the roof of a vehicle and used to support and retain, in constructions known in the art, a generic body, such as a bag, bicycle, etc. on which it rests. Generally this top railing defines the means for securing and retaining the load carried on the vehicle's roof.
- Platform: Indicates a body which includes a surface and/or perimeter, carrier of a load or capable of retaining on it a generic object. This can be also named a modular carrying pallet.
- Selectively Retrievable: It means that, according to this present invention, this platform is selectively removable from its retaining means.
- Modular: This term means that each of said platforms are equal, at least in their retaining and festening means, thus they are interchangeable.

Background and Prior Art of this Instant Invention

Among the known prior art constructions, we may name so-called "luggage racks", or "top railing racks" which comprises a series of bars or cross members joined by lateral members or rails, which in turn are associated to the side edges of the vehicle or stands affixed on the vehicle's roof.

In some latter vehicle models, it is common to observe same are provided with two rails of longitudinal beams tied or linked to the vehicle's roof in vicinity of its side edges. On these two beams, it is possible to link further structures including transversal rods or stringers on which sits the objects to be ported.

These known constructions only allow to settle on them the objects to be transported, for example, boxes, bags, etc., which must be secured by means of ropes or the like with the resulting loss of time, noise and vibrations produced by the passage of wind according to the vehicle's speed. Moreover, these arrangements usually do not allow removing an object from the luggage carrier without altering the stability and retention of the remaining charge, which must be once more distributed and secured to the luggage carrier.

In the past 30 years, there has been developed a series of containers or luggage bins which are securely fastened to said luggage carriers. These containers are really chests, bins or luggage trunks in which clothing, objects, etc. are therein housed, but these trunks fail to constitute a suitable suitcase by themselves, that is, a suitcase that can perform as such when removed from said luggage carrier while at will may be secured to said luggage racks.

Specifically, French patent FR2518470 teaches a trunk formed by two complementary half-shells. The lower shell has a series of transverse depressions, corresponding to seatings to be placed on transversal beams integral with the vehicle. This trunk or bin has all the drawbacks known to its prior art similar objects, that is, they are not able to perform independently as a suitcase or bag, and moreover the lower shell has a single use, namely to be complementary to transversal beams of the luggage carrier and to its upper shell, thus limiting its use only to store clothes and belongings for their transport over the vehicle's roof.

The same objection rests for Spanish patent ES2242926, which discloses a chest or trunk whose lower portion has two deep grooves which move laterally over individually arrange projections (3) defining a sort of dovetail retaining said trunk, but again the latter only serves to hold therein clothes and belongings. Moreover, these projections, when the trunk bag is removed from the roof rack, may produce wind noise and a series of annoying vibrations at speed.

Chinese Utility Model CN 201863776 (U) teaches carrier for clothing and personal belongings (2) which slides on projections that issue from its base over transversal railings (3). Undoubtedly this piece of luggage only serves for its location on the vehicle roof, since such sliding projections have a "U" cross and once this small trunk (2) is disengaged thse "U" projections will interfere and contact any object in its vicinity, including the user's garments, producing imaginable difficulties, thus excluding its use as an autonomous suitcase.

European patent EP0718155 teaches a pair of rails arranged in the longitudinal direction of the vehicle's roof, on which a plurality of trunks are secured. Again, this is an adaptation of the carrier means for trunks on the root of the vehicle, but it does not allow, at least, not without difficulty, to employ these trunks as suitcases by themselves. Also, it presents the inconveniences that if the end trunk is not previously removed, the central trunks cannot be retrieved, that is, this arrangement shown by no means sufficient flexibility of use.

Problems to be Solved in the Prior Art Constructions

It is thus evident the need to have a device carried on the roof of a vehicle and able to fasten or secure a plurality of modular platforms which are selectively and individually retrievable and capable of carrying generic load, being this load, for instance, a suitcase, or a bicycle, a pair of skis, etc. That is, there is a need to have a modular retaining and securing device that allows same to be removed from the vehicle's roof with a portion of the load thereby carried and associated with each module, without altering the layout and state of the rest of the load carried by the remaining platforms. In turn, it is also necessary that the means for securing or fastening said platforms are easy and simple to operate, without the use of screws, nuts, clamps, ropes, etc.

while providing a total security of its fastening or securing connection to the vehicle roof.

Also, the ideal carrier and fastening device of a generic load carried on vehicle's roof should have a relatively low aerodynamic profile to prevent annoying noises and vibrations which happens when the vehicle travels at high speed, with or without a load on the roof, being the latter a factor that is not always adequately considered in the known embodiments. Indeed, it is well known the humming and vibrations originated in the state of the art roof luggage racks.

Another problem, and not least, is in that some of the known constructions, the passage of air at high speed can produce two counterproductive effects: first, an increase in the drag of the vehicle noticed, created by vortices and subsequent vacuum at the trailing end of the luggage rack, and secondly some embodiments have a curved upper surface profile, obtaining effects of aerodynamic lift, tending to reduce the load on the damping of the vehicle, causing their instability.

It is also observable in the known embodiments, when it comes to linking small chests the luggage carrier, same usually have projections and/or bumps that serve to anchor these chests or baggage bins to said roof racks, and even when these chests or bins are used independently as luggage once they are removed from the luggage rack, these projections or attachments prevents or impedes their safe use as an independent bag suitcase, due to the tendency of said projections to interfere with the garments weared by the user, or they take much valuable space or interefere with other luggage in the storage bins, such as it happens commercial aircrafts or buses.

Also, the known roof racks do not contemplate the use of modular load carriers which can be interchangeable, placed and rotated in their position over the vehicle's roof according to specific needs.

Finally, the load carrying device on a vehicle's roof must be easily installed and quickly removable, being able to be stored, possibly folded, so not to take up valuable space when not in use.

OBJECTS OF THIS INSTANT INVENTION

It is a first object of the present invention to provide a luggage carrier structure offering retention or fastening means to a plurality of modular carrier platforms of generic loads, being these modular platforms individually or in combination selectively installed and removable, without altering the load and fastening conditions of the remaining platforms which remains linked to said rack.

Is also an object of this instant invention that each of said platforms performs as a load carrying pallet, having individual retaining means to the rack structure placed on the vehicle's roof, further having individual security and selective locking means.

Is still an object of this invention that these modular platforms or pallets are integrated into the base of a suitcase, presenting this platforms fastening or linking means placed at the bottom or base of the suitcase or luggage, featuring a unique fastening or securing set of means allowing to selectively remove or load said platforms on a luggage carrier structure without altering the use of the bag as such, further lacking said luggage any protruding edges or fittings that could hurt people or damage the surrounding objects, once said bag is removed from the luggage carrier.

It is also an object of the invention that the luggage carrier structure has folding means, allowing to reduce its volume when not installed on the motorcar's roof.

It is an object of the invention that each of these platforms or modular loading pallets presents a loading plane, or edges and engagement means on which it is possible to secure and link objects to be carried, such as boxes, crates, bicycles, paddles, skis, bags, etc.

It is lastly an object of the invention that the roof rack structure and said modular carrier platforms present an aerodynamic profile such that it does not cause noise, whistles and vibrations to the passage of air, and secondly, it provides with surfaces capable of creating a downward pressure damping on the vehicle, thereby increasing its stability despite its centroid or center of gravity is raised due to the roof load, and further it does do produce a braking effect to the vehicle advance (drag effect).

SUMMARY OF THE INVENTION

RETAINING AND SECURING MEANS FOR AT LEAST ONE MODULAR SELECTIVELY REMOVABLE PLATFORM, CARRIER OF A GENERIC OBJECT, TO A TOP RAILING PLACED ON A VEHICLE'S ROOF, said means comprising at least one pair of spaced apart side members parallel to the longitudinal axis of the vehicle linked by a plurality of crossbars or transverse beams appropriately spaced and substantially perpendicular to said longitudinal side members, determining means for securing said structure to the vehicle's roof and on it is possible to secure and carry a load, characterized wherein each of said crossbars has a constant area cross section defined by a closed curve, being the cross section of all or said crossbars of an identical profile and area; from the upper surface of said crossbars projects upwardly at least two small columns per crossbar, being the width of each of these columns of a lesser magnitude than the horizontal diameter of the cross section of: the crossbar; between each pair of crossbars it is linked at least one modular platform which is selectively removable and carrying a generic object, having said at least one platform a bottom surface laterally delimited by corresponding side walls projecting upward, being said portion of bottom surface facing and separated from the roof of the vehicle; said side walls have transversely aligned pairs of recesses with a profile which is complementary to the profile of the crossbar cross section, intercepting said portion of said pair of recesses the bottom surface to form on it a longitudinal slot underlying the crossbar, being this slot parallel thereto and having a smaller width than the horizontal axis of the cross section of said crossbars, and greater than the width of said columns; each slot has opposed edges at each rectilinear slot arranged below each crossbar, providing linking and retaining means for each platform which are laterally sliding along the corresponding crossbar, further slinding said rectilinear slot along each of said columns; said longitudinal side members and crossbars supports positional retention means for each platform; the upwardly exposed upper portions of each platform provides engagement means for the retention of its individual load to be placed on each of said modular platforms.

BRIEF DESCRIPTION OF THE DRAWINGS

The present invention will now be described in greater detail with reference to the accompanying drawings given by way of non-limiting examples of a given construction of the invention, reflecting a preferred construction thereof and in which.

In all the above mentioned figures, the same references designate the same means or their equivalents.

Figure 1:
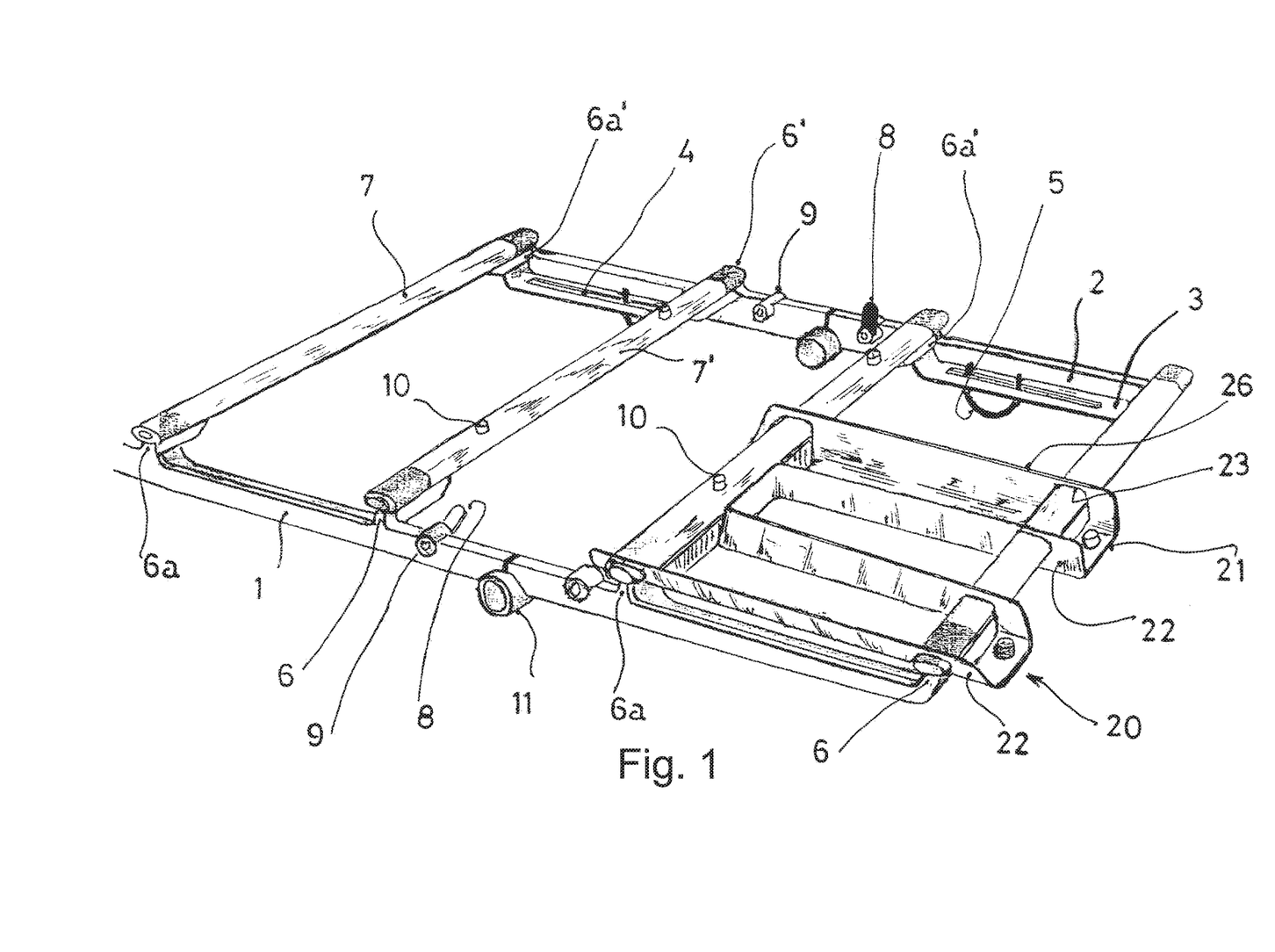
FIG. 1 shows a topside perspective view of an embodiment of the invention, showing the longitudinal beams and the transverse crossbars.
Figure 2:
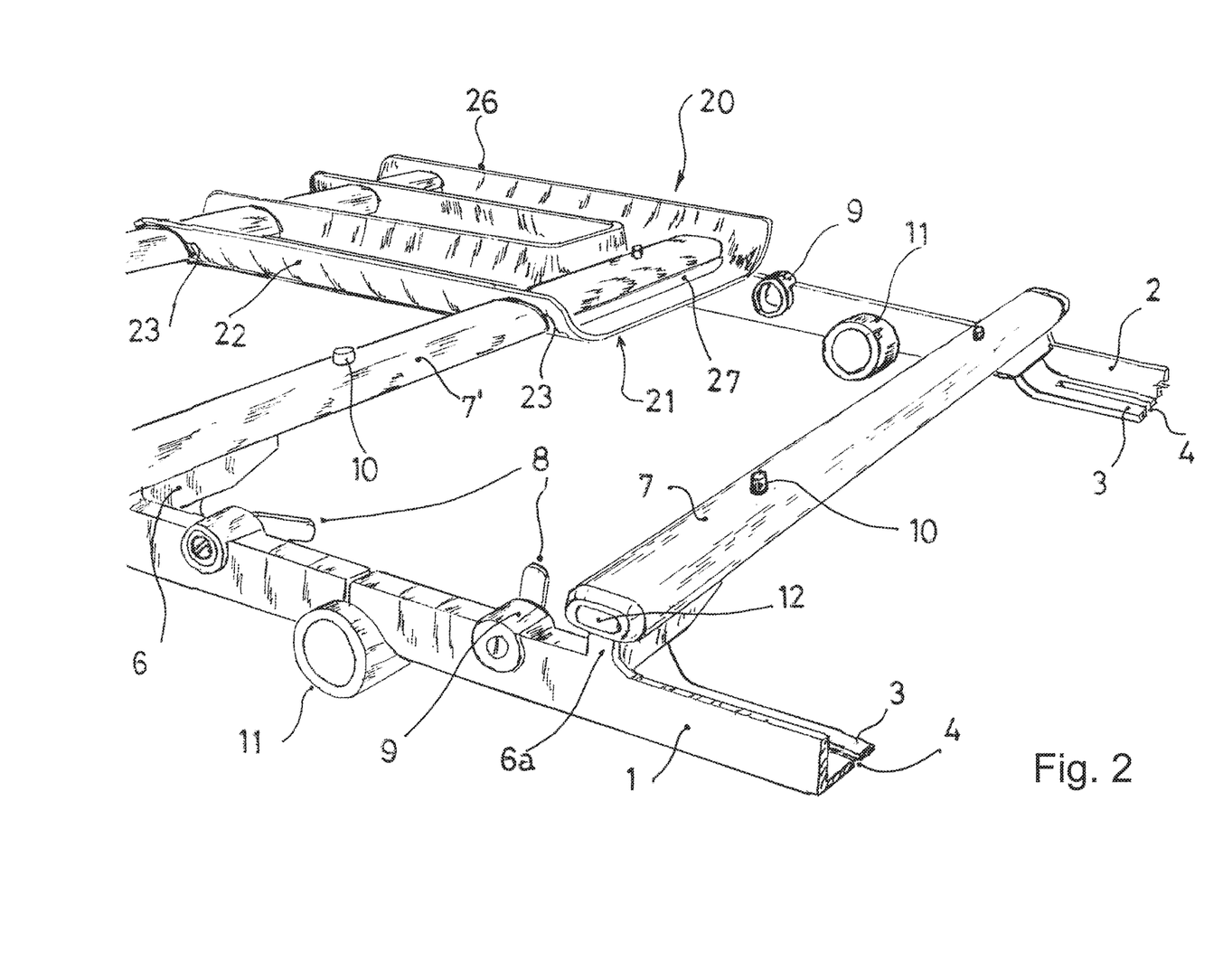
FIG. 2 shows the same object, in an enlarged view, but from the opposite side as shown in FIG. 1.

In FIGS. 1 and 2 we observe a possible construction of the present invention, consisting of two longitudinal beams (1, 2) which are arranged parallel to each other and in the longitudinal direction of the vehicle, i.e., aligned with the longitudinal symmetry axis of the roof. Both beams have parallel to the vehicle roof (not shown) projecting and integral with it corresponding sections of longitudinal flanges (3) projecting preferably from the bottom edge of the longitudinal beams (1, 2), which have means of attachment to the roof or parts of the vehicle, either on its side or on the rails or anchors already fitted provided in most of the latter makes of motorcars. Anyway, these anchors in its many variants are elements by themselves known in the art, so they do not need any further enlargement of its description or operation. To illustrate one of these possible anchors said flanges shows a groove (4) in which is possible insert a known means of attachment (5).

According to this invention, the longitudinal beams (1, 2) are integral to small pair of columns (6, 6', 6a, 6a') which are upwardly projecting from said beams. The columns (6) of one of the beams (1) are transversely aligned with the columns (6') of the other beam (2). Above each pair of these columns (6, 6') sits raised from said longitudinal beams (1, 2) the transverse crossbars (7). The pairs of columns (6, 6'), (6a, 6a') are equidistant to each other, that is, the columns (6a, 6) projecting in the same crossbar (1) are equidistant from the columns (6a', 6') of the parallel beam (2).

On the mutually facing columns. (6a, 6a') and (6, 6') are seated the corresponding crossbars (7), 7'), thus said crossbars are parallel to each other. Ideally this set of beams, columns and crossbars are monolithic, forming a single structure, but nothing prevents the crossbars (7, 7') to be joined by means of fixing screws or bolts or the like (variation not shown).

According to the present invention these crossbars have an equal and uniform cross section. This cross section is defined by a curved perimeter, and more specifically, it is preferred that the perimeter chosen from an ellipse with its long axis placed in the horizontal, to achieve greater aerodynamic penetration and a minor source of noise. In the examples given, said cross section 18 elliptical, but nothing prevents to adopt other cross sections attaining the same effect, such as straight flat surfaces with elliptical ends or circular cross sections.

Between each pair of crossbars (7, 7') it is associated at least one platform generally indicated by reference (20). This platform is rigid, and ideally for each pair of crossbars (7, 7') we have two platforms (20), one beside the other, linked to said crossbars in tandem, and in the second series of crossbars (7, 7') they are placed other two additional platforms (20), so that on the vehicle roof they can be placed at least four modular platforms, preferably equal to each other, making them interchangeable provided the distance between each pair of crossbars is the same. This load layout is flexible, and the user can choose to install a single platform, or two, three or four, or more, according to the number of pair of crossbars, and also the user may choose to install all these platforms (20) side by side (in tandem) or aligned one behind the other, or both. This single concept of interchangeable modular platforms, according to the good knowledge of the inventor, leads to a new conception of loading and transport on the car roof. These platforms (20) are selectively removable and are carrying on the same any object or a generic load (not shown). Each platform (20) has bottom surface (21) delimited by corresponding side wails (22) projecting upward, increasing its resistance module, from said bottom surface (21). This bottom surface 21) is separated from and facing the vehicle roof (please refer to FIGS. 7, 8 and 9).

Figure 3:
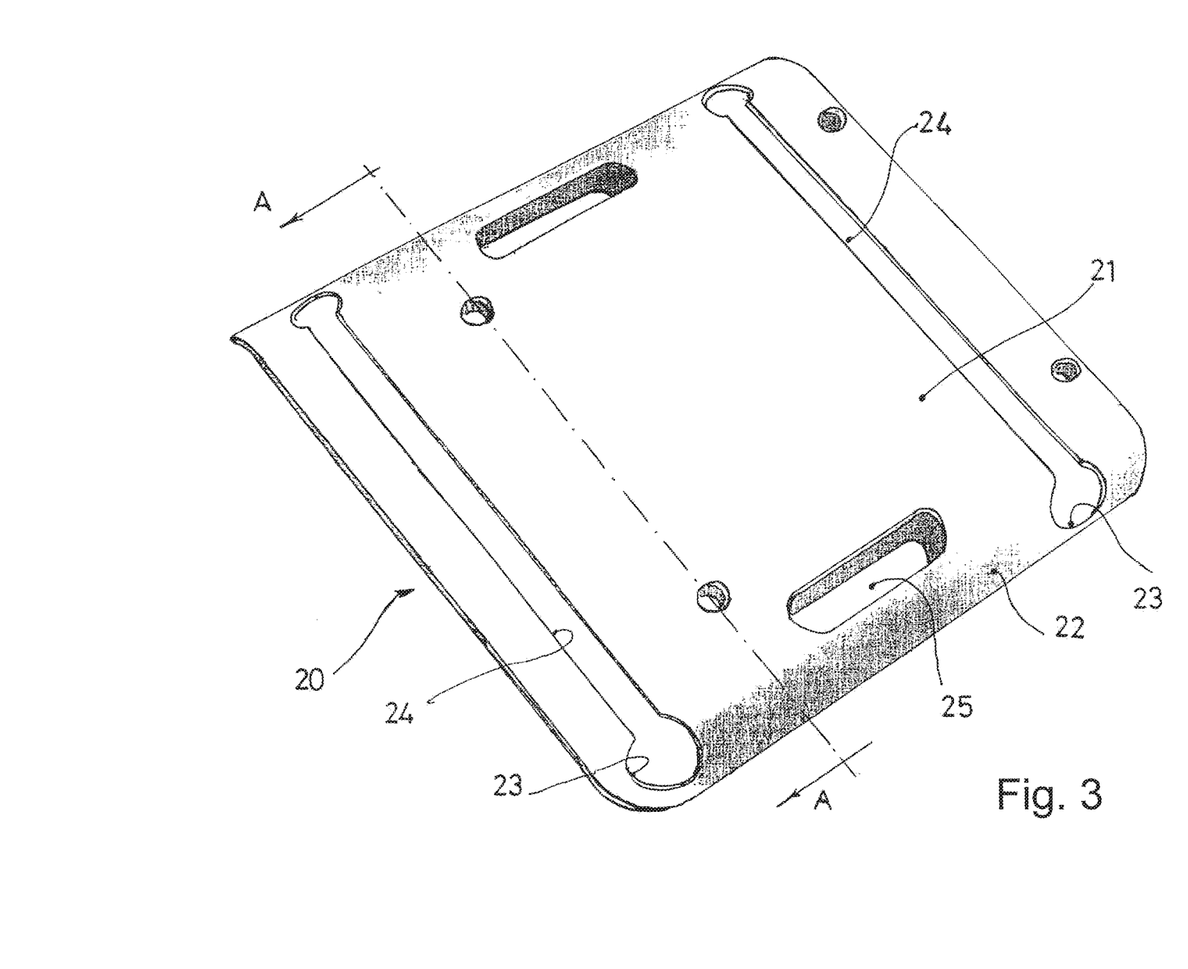
FIG. 3 shows in perspective one of the constructions of the load carrying platform or pallet, in an inverted position, that is, with its lower surface in the foreground.

Preferably observing FIGS. 2 and 3, said side walls (22) have recesses (23) transversely aligned along the same crossbars (7, 7') having a complementary profile to the crossbar, intercepting the said portion of bottom surface (21) with said recess (23) forming a longitudinal slot (24) underlying the crossbars (7, 7')

Also, these platforms (20) may have recesses (25) which enables the user its gripping for their installation and removal. They also have retention means, such as tongues (8) which rotate on a hub (9) integral with the longitudinal beams (1, 2) and In its operative position (for example vertical), supports or accommodated within recesses in the platform (20), locking and preventing the displacement of the corresponding platform. Also, each crossbar may have a plurality of protruding lugs (10) serving to immobilize platforms (20) at a precise location upon said crossbars, being these lugs elastically depressable within the crossbar to allow for the passage of the recesses (25) of the platform (20) upon its installation on said roof rack.

Figure 4:
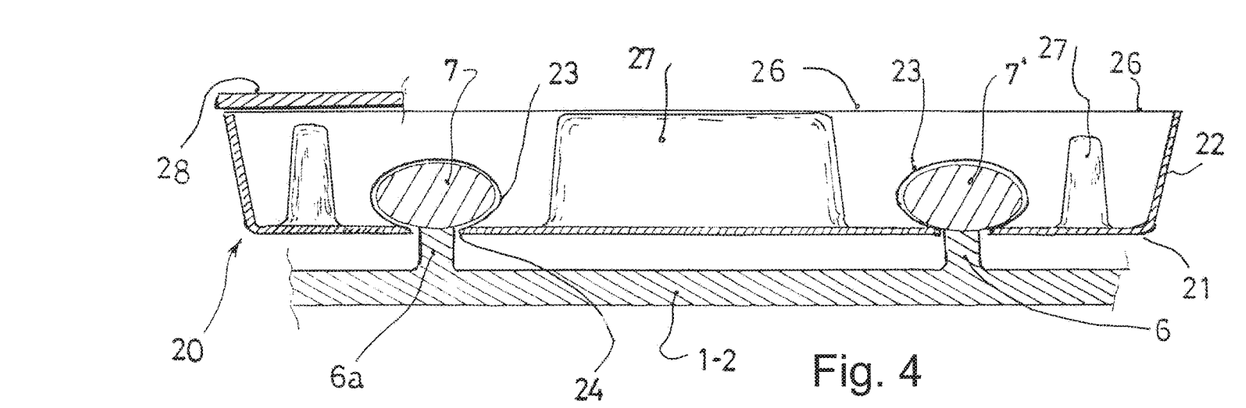
FIG. 4 shows cross section in AA of FIG. 3 with a constructive version of the platform assembled on the crossbars.

Each platform (20) has an edge (26) which serves as support for the load (not illustrated) or allows binding to a surface or as well as any other known carrier means, such as for a bicycle, bag, etc., which can be complemented by the projections (27) as shown in FIG. 4, or by a surface (28), which seats and links the perimeter (26), which is partly shown in the figure, and serves to support generic loads. In a preferred construction of the invention, but not limiting thereof, these platforms are coupled and integrated to boxes, forming a luggage bin. That is, upon removal of said luggage bin, it carries attached to it the corresponding modular platform, acting the whole as a suitcase, without projections or protrusions enabling its use in public transportation such as aircraft, buses, etc.

Additionally, the present invention contemplates that the longitudinal beams (1, 2) can be folded when they are not in use, turning on hinges or the like (11).

Figure 6:
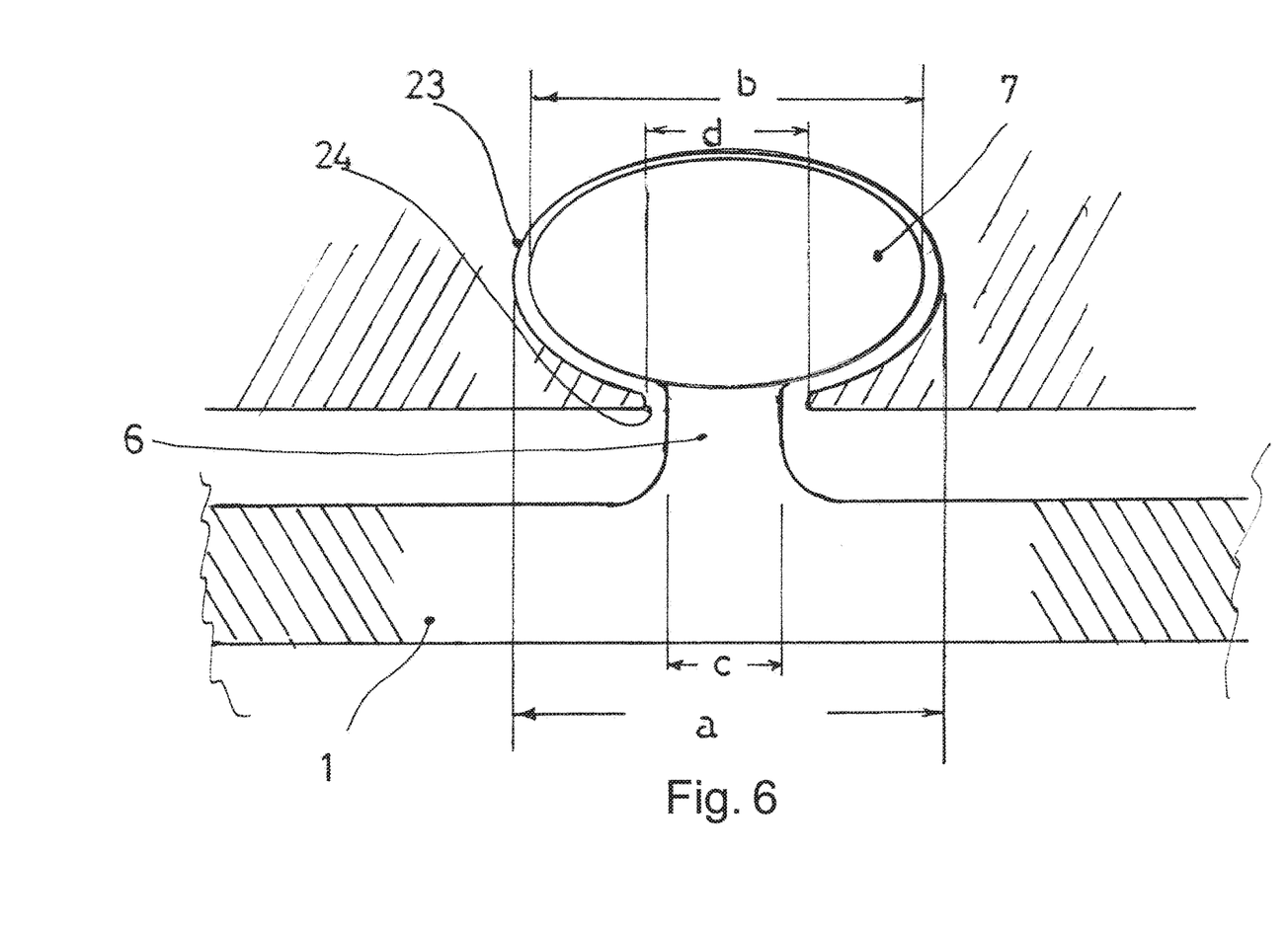
FIG. 6 is an enlarged detail of FIG. 4.

The conditions the tray or platform (20) of this invention must comply in respect to the crossbars design and columns are shown at FIG. 6 and they are:

The horizontal diameter <a> of recess (23) must be greater than the horizontal diameter <b> of the cross section of crossbar (7), and the width <d> of the groove (24) must be greater than width <c> of the column (6).

Figure 5:
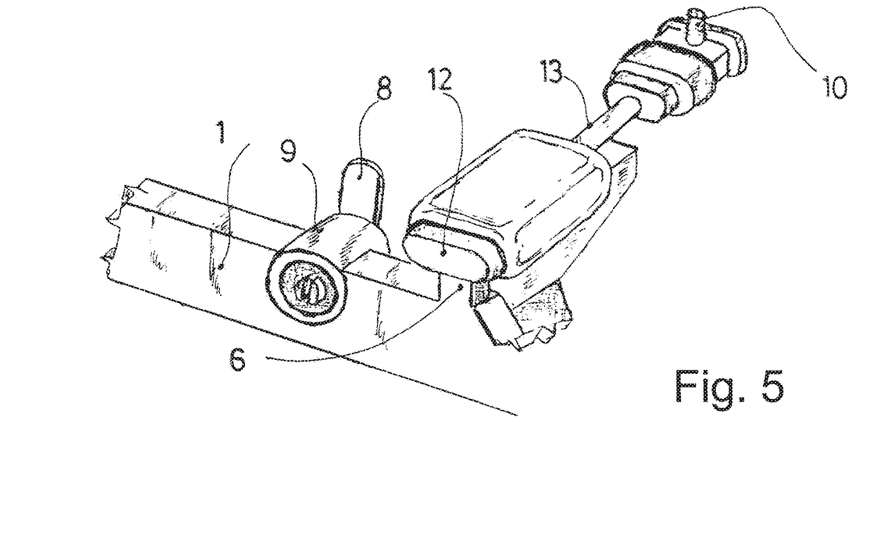
FIG. 5 illustrates in perspective a detail of one of the locking means of the platform about its stable positioning on the crossbars.

FIG. 5 shows in perspective a detail of one of the possible means for retaining the platform or tray (20). This construction is based on the crossbars (7, 7') which may be are internally hollow or at least partially hollow; within them is lodged a known device which by pressing a button (12) at the end of crossbar, drives a shaft (13) which moves down the lug or projection (10).

Figure 7:
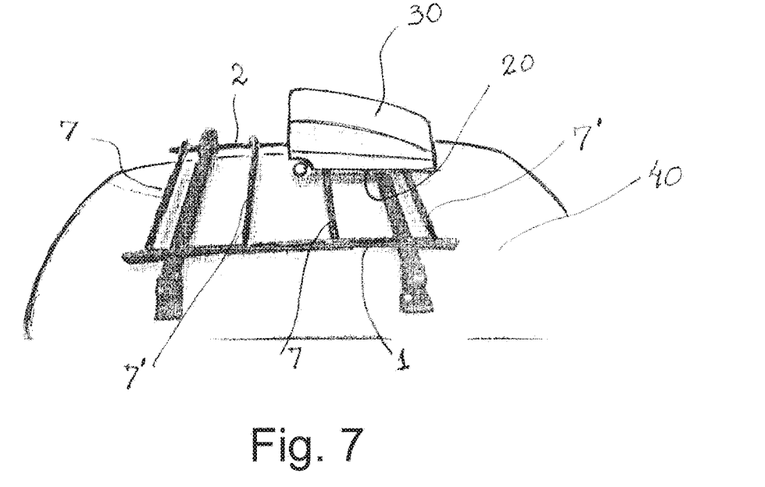
FIGS. 7, 8 and 9 are showing one of the possible loading sequences of the modular platforms of the invention to a luggage carrier, in the version in which these platforms are integrated to respective bags or suitcases.
Figure 8:
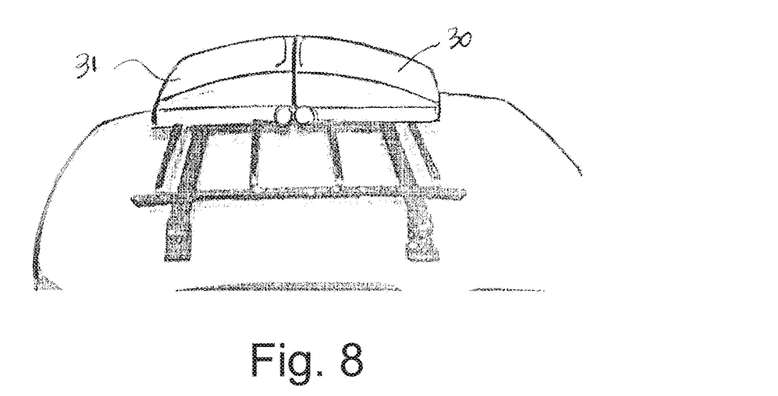
Figure 9:
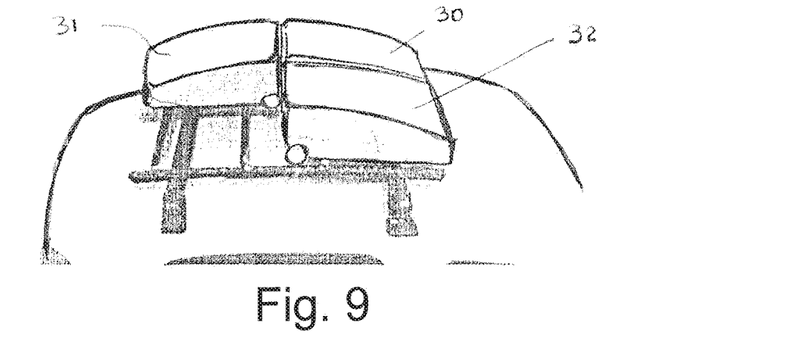

FIG. 7 shows a top perspective construction of a luggage carrier according to the invention which consists of the beams (1, 2) to which the pairs of crossbars (7, 7') are attached. On rear of pair (7, 7') of the crossbars it is placed a suitcase (30) which is integrated to the carrying platform (20), whose lower surface (21) face the top of the roof (40) of the vehicle. FIG. 8 shows the placement upon the same luggage carrier of a second suitcase (31) similar to the former (30), and FIG. 9 shows the placement of a third suitcase (32). In the figures, it is seen that these suitcases, depending on the condition that all the platform modules (20) are alike, all of them are interchangeable allowing one of them to be removed Or loaded, without disturbing the rest of the load on the roof rack.

As said, the number of pair of crosssbars (7, 7') limits the number of platforms (20) carried on the roof. For instance, if we have three pairs of crossbars (7, 7'), a maximum of six carrying platforms may be installed on the vehicle's roof.

The invention claimed is:

1. A retaining and securing device for at least one modular and selectively removeable platform for supporting a generic object, where the retaining and securing device attaches to a top railing placed on a vehicle's roof, said device comprising:
    a pair of longitudinal members;
    a plurality of crossbars; and
    a modular platform;
    wherein when assembled to the vehicle:
        said pair of longitudinal members extend spaced apart and parallel to a longitudinal axis of the vehicle;
        said plurality of crossbars are spaced from each other and are substantially perpendicular to said pair of longitudinal members defining a luggage rack linked to the vehicle's roof upon which a load can be arranged and secured to be thus carried;
        each of said plurality of crossbars has a constant cross-sectional area formed by a closed curve, wherein each of said plurality of crossbars is seated on and linked to small columns projecting upward from said pair of longitudinal members;
        said modular platform is selectively removable from and is securable between an adjacent pair of crossbars of said plurality of crossbars for carrying a generic object as a load;
        said modular platform is of a rigid nature with a bottom surface portion laterally delimited by corresponding opposite side walls projecting upward, said bottom surface portion being spaced from and facing the roof of the vehicle;
        both of said side walls have pairs of recesses that are transversely aligned, having a complementary profile to a select one of said plurality of crossbars, intercepting said bottom surface portion of said modular platform,
        each one of said recesses form a longitudinal slot on a lower surface, and are extended and underlying a corresponding one of the plurality of crossbars extending parallel thereto from a first recess to an opposite recess of a select one of the pairs of recesses;
        a horizontal axis of a cross section of a select one of said plurality of crossbars is greater than a horizontal width of an associated one of the pairs of recesses, whereas a width of the longitudinal slot is greater than a width of the columns, said recesses being slideable along surfaces of a cross section of the pair of corresponding crossbars on which said modular platform rests, wherein said longitudinal slot:
            is present under a rectilinear edge of said crossbar; and
            creates engagement means and retention slot edges of the modular platform; and
        said luggage rack having positional retention means for each modular platform wherein upwardly exposed upper portions of each modular platform create an engagement and retention means for the load to be conveyed on each of said modular platforms.

2. The device according to claim 1, wherein the profile of each one of said recesses and said complementary cross section of each crossbar is selected from an ellipse, an ellipsoid, ellipse with major lateral flattened sides, and a circle, wherein all of said cross sections for all of said crossbars are of the same shape and have equal dimensions.

3. The device of claim 1, wherein the horizontal axis of the cross section of each crossbar is greater than its vertical axis, presenting a lower profile drag.

4. The device of claim 1 further comprising at least one additional modular platform, each one of the modular platforms being individually attachable and disengageable to said luggage rack without altering the loading status of the other modular platforms.

5. The device of claim 4, wherein:
    each modular platform is selectively linkable to a chest or suitcase, the rigid platform and chest assembly performing like an independent suitcase when the modular platform, along with said chest or bin, is detached from bearing on the crossbars.

6. The device of claim 1, wherein:
    the corresponding lateral walls of said modular platform are obliquely projected upwards.

7. The device of claim 1, wherein:
    the upper portions of said modular platform defines the securing and fastening means of the load to be carried on said modular platform.

8. The device of claim 1, wherein:
    said transverse crossbars are placed by pairs at an equal distance between each pair, further comprising at least one additional modular platform, wherein each modular platform is of equal shape and dimensions, being each platform interchangeable with the other upon said luggage rack.

9. The device of claim 1, wherein:
    said longitudinal members and said crossbars have retention means able to hold in place the corresponding modular platform.

* * * * *

UNITED STATES PATENT AND TRADEMARK OFFICE
CERTIFICATE OF CORRECTION

PATENT NO. : 10,053,021 B2
APPLICATION NO. : 15/526185
DATED : August 21, 2018
INVENTOR(S) : Raul Arnaldo Cabiche Page 1 of 1

It is certified that error appears in the above-identified patent and that said Letters Patent is hereby corrected as shown below:

On the Title Page

Item (73) Assignees:
"Raul Amaldo Cabiche, C.A. de Buenos Aires (AR)" should read --Raul Arnaldo Cabiche, C.A. de Buenos Aires (AR)--.

Item (57) Abstract:
Line 3 on continued page; "he conveyed on" should read --be conveyed on--.

Signed and Sealed this
Twenty-third Day of October, 2018

Andrei Iancu
*Director of the United States Patent and Trademark Office*